United States Patent
Evans

[11] 3,711,131
[45] Jan. 16, 1973

[54] HOSE END COUPLINGS
[75] Inventor: Harry James Evans, London, England
[73] Assignee: Flextube Limited, London, England
[22] Filed: Feb. 17, 1971
[21] Appl. No.: 116,004

[30] Foreign Application Priority Data
  Feb. 25, 1970  Great Britain.....................9,150/70

[52] U.S. Cl.................................285/256, 285/259
[51] Int. Cl..............................................F16l 33/00
[58] Field of Search..............285/256, 254, 149, 257

[56] References Cited
UNITED STATES PATENTS
3,347,571  10/1967  New.................................285/256 X
2,476,480  7/1949  Burckle et al........................285/149

FOREIGN PATENTS OR APPLICATIONS
138,557  9/1950  Australia...............................285/256
1,136,935  1/1957  France................................285/259

Primary Examiner—Dave W. Arola
Attorney—Dowell & Dowell

[57] ABSTRACT

A hose end coupling of the kind comprising a tubular nipple or insert piece which is forced into the interior of the hose and is formed with exterior circumferential ribs to grip the interior wall of the hose and an internally circumferentially ribbed ferrule which is swaged over the tube to compress the hose wall between the ferrule and the insert, an inwardly extending lip on the ferrule engaging in a groove in the insert beyond the end of the hose. Wherein the ribs of the ferrule are in two sets separated by a groove which is wider and deeper than the space between any pair of adjacent ribs, the ribs of the set nearer the outer end of the ferrule having a smaller internal diameter than the majority of the ribs of the innermost set of which the rib adjacent the groove has an internal diameter substantially equal to that of the ribs of the outer-set.

1 Claim, 1 Drawing Figure

PATENTED JAN 16 1973 3,711,131
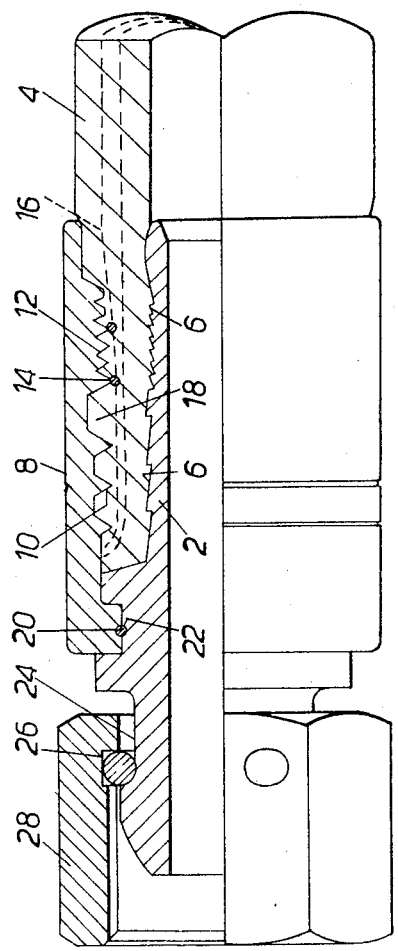
Inventor
Harry Pewes Evans
By Dowell & Dowell
Attorneys

HOSE END COUPLINGS

This invention relates to hose end couplings.

In a conventional form such couplings comprise a tubular nipple or insert piece which is forced into the interior of the hose and is formed with exterior circumferential ribs to grip the interior wall of the hose and an internally circumferentially ribbed ferrule which is swaged over the tube to compress the hose wall between the ferrule and the insert, an inwardly extending lip on the ferrule engaging in a groove in the insert beyond the end of the hose. Such a coupling will hereafter be referred to as a "swaged hose end coupling."

The ferrule of a swaged hose end fitting in accordance with the invention is formed internally with two sets of inwardly facing circumferential ribs separated by a groove which is wider and deeper than the space between any pair of adjacent ribs, the ribs of the set nearer the outer end of the ferrule having a smaller internal diameter than the majority of the ribs of the innermost set of which the rib adjacent the groove has an internal diameter substantially equal to that of the ribs of the outer-set.

The groove acts to aid the retention of the ferrule on the hose due to the fact that the compression of the hose caused by the swaging of the ferrule, forces the wire reinforcement of the hose outwardly into the annular groove between the two sets of ribs. The fact that the outer set of ribs have a smaller internal diameter enables them to create high hose compression areas and the relatively larger internal diameter of the ferrule over the region of the majority of the second set or ribs, creates slightly reduced hose compression in these areas of the hose where sealing is to be effected but where the hose liner must not be fractured if a high pressure seal is to be maintained.

As the rib of the inner set adjacent the groove has an internal diameter substantially equal to that of the ribs of the outer set the groove is effectively deepened and greater outward deformation of the wire reinforcement of the hose is achieved whilst maintaining the relatively lower compression in the fluid seal areas opposite to the second set of ribs.

An embodiment of a hose end coupling in accordance with the invention is shown in the accompanying sketch drawing which is a half cross-section elevation through the coupling.

The coupling comprises a tubular nipple or insert piece 2 which is inserted in the bore of a hose 4 the nipple being formed with exterior circumferential ribs or teeth 6 to aid in proper connection with the bore of the hose.

The tubular ferrule which is located over the base and swaged into the position shown, is formed with two sets of interior circumferential ribs or teeth 10 and 12 the outer set 10 have a smaller diameter and thus project further into the bore the majority of the second set 12 although the outermost rib 14 of the second set has the same internal diameter and projects inwardly to the same extent as the ribs 10.

The ribs 10 which are broader and more widely spaced as well as deeper than the ribs 12, are forced into the surface of the hose and cause the wire reinforcement generally indicated at 16 to deform into a groove 18 formed between the two sets of teeth. As the foremost rib 14 of the second set of ribs projects inwardly to the same extent as the second set of ribs the groove 18 is deeper than if the first rib 14 was the same height as ribs 12 and the wire reinforcement is caused to be deformed upwardly into the groove somewhat as illustrated to aid gripping of the coupling on the hose when subjected to high pressure.

The relatively shallow ribs 12 act to form a seal, with slightly reduced compression of the hose, in the area where sealing has to be effected but where the hose liner must not be fractured.

In accordance with conventional practice the outer end of the ferrule is formed with an inward lip 20 which is swaged into a corresponding groove 22 on the surface of the nipple or insert piece so that proper connection between the nipple and ferrule is achieved.

Also typical of conventional practice the outer end of the nipple or outer insert piece is provided with a groove 24 receiving a wire circlip 26 to hold a coupling nut 28 onto the nipple whilst allowing it to rotate relatively to the nipple.

I claim:

1. In a hose having an outer casing, a wire reinforcement and a bore therein, an end fitting comprising:
   a tubular nipple inserted in the said bore at an end of the hose;
   a coupling nut rotatably retained on the nipple; and
   a swaged ferrule having an outer end adjacent said nut and an inner end remoted from said nut, and formed internally with two sets of inwardly facing hose engaging circumferential ribs both of which sets engage said outer casing, the sets of ribs being separated by a groove which is wider and deeper than the space between any pair of adjacent ribs, the ribs of the set nearer the outer end of the ferrule having a smaller internal diameter than the majority of the innermost set and being broader and being more widely spaced than the ribs of the innermost set, the rib of the innermost set adjacent the groove having an internal diameter substantially equal to that of the outer set.

* * * * *